(12) United States Patent
Kim et al.

(10) Patent No.: US 9,057,355 B2
(45) Date of Patent: Jun. 16, 2015

(54) WIND TURBINE WITH GENERATOR DISPOSED AT FRONT THEREOF

(75) Inventors: Doo Hoon Kim, Cheonan-si (KR); Ji Yune Ryu, Daejeon (KR); Jin Il Park, Suwon-si (KR); Jo Hyug Bang, Gwangju-si (KR); Jin Su Hwang, Daejeon (KR); Dong Jin Seo, Daejeon (KR)

(73) Assignee: UNISON CO., LTD., Sacheon-si (KR)

( * ) Notice: Subject to any disclaimer, the term of this patent is extended or adjusted under 35 U.S.C. 154(b) by 699 days.

(21) Appl. No.: 13/322,924

(22) PCT Filed: Jun. 3, 2010

(86) PCT No.: PCT/KR2010/003559
§ 371 (c)(1),
(2), (4) Date: Nov. 29, 2011

(87) PCT Pub. No.: WO2010/140842
PCT Pub. Date: Dec. 9, 2010

(65) Prior Publication Data
US 2012/0076664 A1 Mar. 29, 2012

(30) Foreign Application Priority Data
Jun. 4, 2009 (KR) .......................... 10-2009-0049581

(51) Int. Cl.
*F03D 9/02* (2006.01)
*F03D 11/02* (2006.01)
(Continued)

(52) U.S. Cl.
CPC .............. *F03D 9/002* (2013.01); *F03D 11/028* (2013.01); *F03D 11/04* (2013.01);
(Continued)

(58) Field of Classification Search
CPC ..... F03D 1/00; F03D 11/005; F03D 11/0075; F03D 11/028; F03D 11/04; H02K 7/1838; H02K 7/083; H02K 7/085; F05B 2240/14; F05B 2220/7066
USPC ...... 290/44, 55; 415/244 R, 246, 244 A, 148, 415/149; 416/244 R, 246, 244 A, 148, 149
See application file for complete search history.

(56) References Cited

U.S. PATENT DOCUMENTS 6,285,090 B1 * 9/2001 Brutsaert et al. ................. 290/55
6,781,276 B1 * 8/2004 Stiesdal et al. ............. 310/254.1
(Continued)

FOREIGN PATENT DOCUMENTS

| JP | 2002303253 A | 10/2002 |
| JP | 2009019625 A | 1/2009 |
| KR | 100695012 B1 | 3/2007 |

*Primary Examiner* — Edward Look
*Assistant Examiner* — Christopher R Legendre
(74) *Attorney, Agent, or Firm* — Novick, Kim & Lee, PLLC; Jae Youn Kim

(57) ABSTRACT

Disclosed is a wind turbine with a generator, which minimizes design limitations on the diameters of generators and allows a rotor and the generator to be stably fixed to a tower. The wind turbine includes a rotor including a hub at a center thereof, a rotating shaft protruding rearward of the hub, and a plurality of rotor blades provided around the hub; a generator including a housing disposed at an outer upper portion of a tower behind the rotor and provided at an inner surface of a cylindrical body thereof with a stator and a rotator rotatably coupled in the housing to rotate together with the rotor; and a support bracket fixed to an upper end portion of the tower, wherein the housing is fixed to a front surface of the support bracket to integrally fix the rotor and the generator to the tower.

1 Claim, 5 Drawing Sheets

(51) Int. Cl.
*H02K 7/08* (2006.01)
*F03D 9/00* (2006.01)
*F03D 11/04* (2006.01)
*H02K 7/18* (2006.01)

(52) U.S. Cl.
CPC .... *F05B 2220/7066* (2013.01); *F05B 2240/14* (2013.01); *H02K 7/083* (2013.01); *H02K 7/085* (2013.01); *H02K 7/1838* (2013.01); *Y02E 10/725* (2013.01); *Y02E 10/728* (2013.01); *Y02E 10/721* (2013.01)

(56) References Cited

U.S. PATENT DOCUMENTS

| | | | |
|---|---|---|---|
| 7,042,109 B2 * | 5/2006 | Gabrys | 290/44 |
| 7,183,665 B2 * | 2/2007 | Bywaters et al. | 290/55 |
| 7,282,808 B2 * | 10/2007 | Shibata et al. | 290/55 |
| 7,431,567 B1 * | 10/2008 | Bevington et al. | 416/244 R |
| 7,891,941 B2 * | 2/2011 | Bevington et al. | 415/123 |
| 7,944,074 B2 * | 5/2011 | Longtin et al. | 290/55 |
| 7,956,484 B2 * | 6/2011 | Stiesdal | 290/55 |
| 8,084,879 B2 * | 12/2011 | Stiesdal | 290/55 |
| 2004/0232704 A1 | 11/2004 | Casazza | |
| 2005/0230979 A1 | 10/2005 | Bywaters | |
| 2006/0071575 A1 * | 4/2006 | Jansen et al. | 310/266 |
| 2009/0015020 A1 * | 1/2009 | Stiesdal | 290/55 |
| 2009/0134630 A1 * | 5/2009 | Stiesdal | 290/55 |
| 2010/0045047 A1 * | 2/2010 | Stiesdal | 290/55 |
| 2011/0001320 A1 * | 1/2011 | Lagerweij et al. | 290/55 |
| 2012/0076664 A1 * | 3/2012 | Kim et al. | 416/244 R |

* cited by examiner

WIND TURBINE WITH GENERATOR DISPOSED AT FRONT THEREOF

TECHNICAL FIELD

The present invention relates to a wind turbine. More particularly, the present invention relates to a wind turbine provided at a front thereof with a generator such that rotational energy of a rotor can be directly transferred to the generator without being transferred to a speed increaser.

BACKGROUND ART

As well known to those skilled in the art, wind turbines generate electricity using the power of a rotor, which is rotated by wind. In general, a tower is installed at a designated height above the ground. In addition, a rotor rotated by wind, a speed increaser to increase the rotational speed of the rotor and a generator coupled to the speed increaser to generate the power are sequentially coupled to the top end portion of the tower.

However, if the speed increaser has the above configuration, the structure of the wind turbine may become complicated, so that the manufacturing cost and the repair and maintenance cost may be increased. In addition, the weight of the wind turbine may be increased, so the structural strength of the tower must be reinforced.

In order to solve the above problem, applicant of the present invention suggests a structure of a wind turbine without a speed increaser, which has been filed on Mar. 24, 2006 and now registered as Korean Patent Registration No. 695012. As shown in FIG. 5, a tower 100 is installed at a designated height above the ground and a rotor 200 having a plurality of rotor blades 202 fixed about a hub 201 is installed at the upper portion of the tower 100. A rotating shaft 300 rotatably coupled to the tower 100 is supported by a bearing 301 behind the rotor 200, and a generator 400 is coupled to a rear end of the rotating shaft 300.

In addition, the generator 400 includes a cylindrical housing 401, a rotating plate 402 rotatably coupled to the rotating shaft 300 in the housing 401, a rotator 403 coupled to the outer peripheral portion of the rotating plate 402, and a stator 404 coupled to an inner peripheral surface of the housing 401 to generate the electromagnetic induction through the interaction with the rotator 403.

However, since the rotating shaft 300 crosses the upper end of the tower 100, the length of the rotating shaft 300 may exceed the diameter of the tower 100, so that the weight of the wind turbine may be increased. In addition, the rotating shaft 300 may be sagged or twisted.

DISCLOSURE

Technical Problem

The present invention has been made to solve the above problems occurring in the prior art, and an object of the present invention is to provide a wind turbine, in which a rotor and a generator are coupled to a front surface of a support bracket, so there is no design limitation on the diameter of the generator and the rotor and the generator may be stably fixed to a tower.

Another object of the present invention is to provide a wind turbine capable of securely coupling a rotating shaft to a housing even if a bearing supporting the rotating shaft has a small diameter.

Still another object of the present invention is to provide a wind turbine capable of enhancing the bending strength of a rotating shaft while preventing the rotating shaft from moving rearward when a rotor is rotated.

Still another object of the present invention is to provide a wind turbine, in which a rotor is directly fixed to a fixing shaft protruding from a support bracket.

Still another object of the present invention is to provide a wind turbine capable of smoothly rotating a rotor while preventing rainwater or dust from penetrating into a housing through a gap between the housing and a rotating shaft.

Still another object of the present invention is to provide a wind turbine capable of maximizing the twist strength of a rotating shaft while allowing a worker to readily move along the path among a support bracket, a generator and a hub.

Technical Solution

In order to accomplish the above object, the present invention provides a wind turbine including a rotor including a hub at a center thereof, a rotating shaft protruding rearward of the hub, and a plurality of rotor blades provided around the hub; a generator including a housing disposed at an outer upper portion of a tower behind the rotor and provided at an inner surface of a cylindrical body thereof with a stator and a rotator rotatably coupled in the housing to rotate together with the rotor; and a support bracket fixed to an upper end portion of the tower, wherein the housing is fixed to a front surface of the support bracket to integrally fix the rotor and the generator to the tower.

According to the exemplary embodiment of the present invention, the housing is formed at front and rear surfaces thereof with a perforation hole into which the rotating shaft is inserted, a bearing is provided in the perforation hole to support the rotating shaft, and a coupling hole is formed at a center of the rotator such that the rotating shaft is inserted into the coupling hole.

According to the exemplary embodiment of the present invention, the rotating shaft has a diameter gradually increased from a front side thereof, which is coupled to the hub, to a rear side thereof.

According to the exemplary embodiment of the present invention, the rotating shaft has a cylindrical shape with an open rear surface and extends rearward of the hub, a cylindrical coupling hole is formed at a center of the rotator such that the rotating shaft is inserted into the cylindrical coupling hole, and a fixing shaft protrudes forward of the support bracket such that the fixing shaft is coupled with the hub by passing through the housing and the rotating shaft.

According to the exemplary embodiment of the present invention, the rotating shaft has a cylindrical shape with an open rear surface and extends rearward of the hub, a shaft insertion hole is formed at a front surface of the housing and extends inward of the housing such that the rotating shaft is inserted into the shaft insertion hole, a bearing is installed in the shaft insertion hole to support the rotating shaft, and a coupling tube is provided at a center of the rotator, in which the coupling tube has a diameter corresponding to a diameter of the rotating shaft and is integrally fixed to an end of the rotating shaft.

According to the exemplary embodiment of the present invention, the rotating shaft has a cylindrical shape with an open rear surface and protrudes rearward of the hub, a coupling hole is formed at a center of the rotator with a diameter corresponding to a diameter of the rotating shaft such that an end portion of the rotating shaft is inserted into the coupling hole, a support tube protrudes from a front surface of the support bracket such that the support tube is communicated with an internal space of the support bracket and fixedly inserted into the housing, and a bearing is provided at the outer end of the support tube such that the rotating shaft is rotatably coupled with the support tube.

Advantageous Effect

According to the present invention, vibration of the generator can be minimized.

BEST MODE

Mode for Invention

Hereinafter, exemplary embodiments of the present invention will be described in detail with reference to accompanying drawings.

Figure 1:
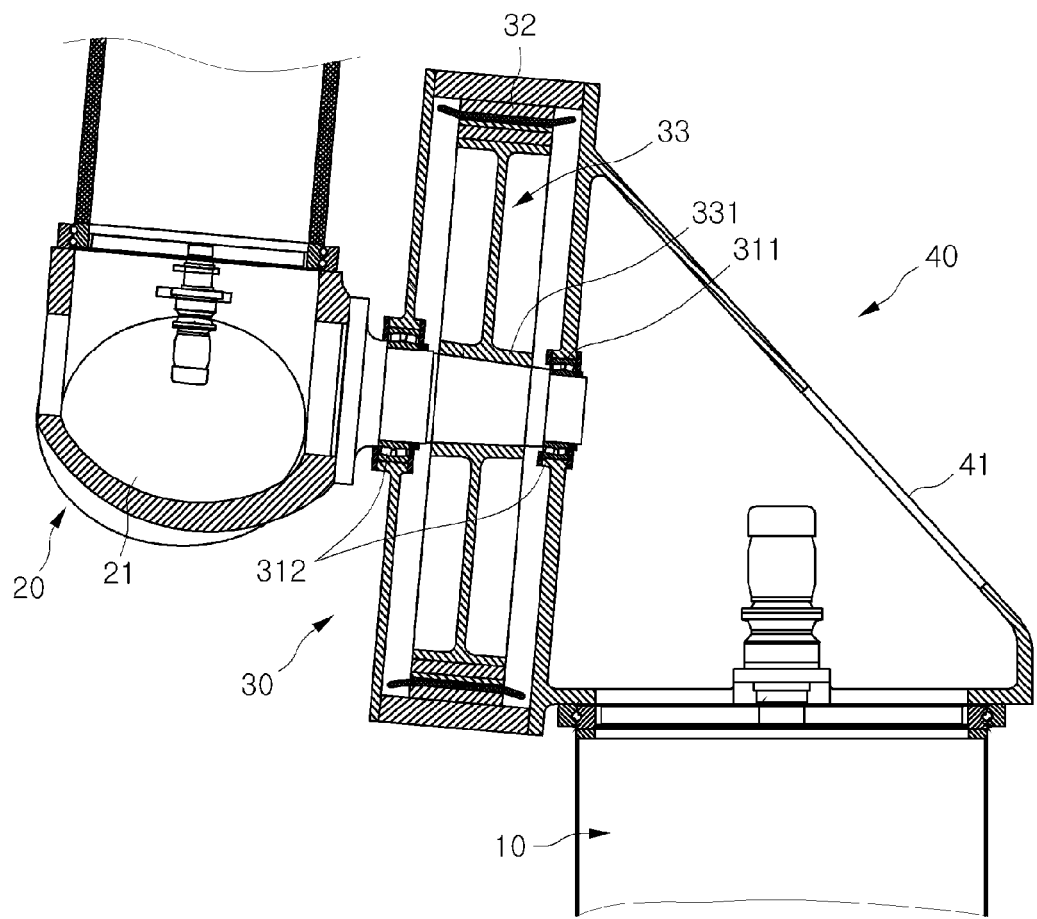
FIG. 1 is a longitudinal section view showing the first embodiment of the present invention.

FIG. 1 is a longitudinal section view showing the first embodiment of the present invention. As shown in FIG. 1, according to the present invention, an additional speed increaser is not provided between a rotor 20 and a generator 30, so the rotational force of the rotor 20 is directly transferred to the generator 30. In particular, the generator 30 is spaced apart from an upper portion of a tower 10 and fixed by a support bracket 40, so there is no design limitation on the diameter of the generator 30. In addition, the rotor 20 and the generator 30 are coupled to a front surface of the support bracket 40.

The tower 10 is a structure for supporting various components of the wind turbine above the ground and is made from metal rods having strength. The tower 10 is installed vertically to the ground in such a manner that the rotor 20 can be disposed at a higher position where the wind speed and quantity of wind may be high.

The rotor 20 is rotated by wind to rotate a rotator 33. A hub 21 is provided at the center of the rotor 20 concentrically to the rotator 33 and a rotating shaft protrudes rearward of the hub 21. A plurality of rotor blades are coupled to an outer peripheral surface of the hub 21. As the rotor blades are rotated by the wind, the hub 21 is also rotated so that the rotating shaft coupled to the hub 21 is rotated.

The generator 30 is rotated according to the rotation of the rotor 20, thereby generating electric power. The generator 30 is disposed at an outer upper portion of the tower 10 rearward of the rotor 20 and includes a housing coupled to an inner surface of a cylindrical body and the rotator 33 rotatably coupled to the rotor 20 in the internal space of the housing.

A stator 32 of the generator 30 is fixed to the inner surface of the housing in such a manner that the electric power can be easily generated through the electromagnetic induction between the stator 32 and the rotator 33. Preferably, a plurality of bearings 312 are installed in the housing to support the rotating shaft.

The support bracket 40 is configured to integrally fix the generator 30 and the rotor 20 to the upper end portion of the tower 10 while stably transferring the loads of the generator 30 and the rotor 20 to the tower 10. The support bracket 40 has a flat bottom surface fixed to the upper end portion of the tower 10, and a front portion of the support bracket 40 is aligned perpendicularly to the ground such that the generator 30 can be fixed thereto. A rear load support part 41 is provided at a rear portion of the support bracket 40. The rear load support part 41 is inclined toward the rear surface of the generator 30 so that the loads of the generator 30 and the rotor 20 can be effectively distributed and the generator 30 and the rotor 20 can be securely fixed to the support bracket 40.

According to the above configuration, the housing may not interfere with the tower 10 even if the housing has a large diameter, so there is no design limitation on the diameter of the housing and the rotor 33. Thus, the housing and the rotor 33 may be designed with the large diameter, so the angular speed is increased at a region where the stator 32 faces the rotator 33, thereby improving the efficiency of the electric power production.

The rotating shaft is made from a metal rod having strength and perforation holes 311 are formed in the front and rear surfaces such that the rotating shaft can be inserted into the perforation holes 311. The bearings 312 are installed in the perforation holes 311 to support the rotating shaft, and a tubular coupling hole 331 is formed at the center of the rotator 33 such that the rotating shaft can be inserted into the tubular coupling hole 331.

Therefore, front and rear sides of the rotating shaft are simultaneously supported on the housing, so that vibration may not be generated when the rotating shaft is rotated and the rotating shaft can be prevented from being bent. In addition, since the diameter of the bearings 312 can be diminished, the repair and maintenance work for the wind turbine can be simplified.

The diameter of the rotating shaft is gradually increased from the front side connected to the hub 21 to the rear side. Thus, when the rotor 20 is pushed toward the generator 30 caused by strong wind, the movement distance of the rotating shaft may be restricted so that the rotator 33 of the generator 30 can be smoothly rotated, thereby facilitating the electric power production.

Figure 2:
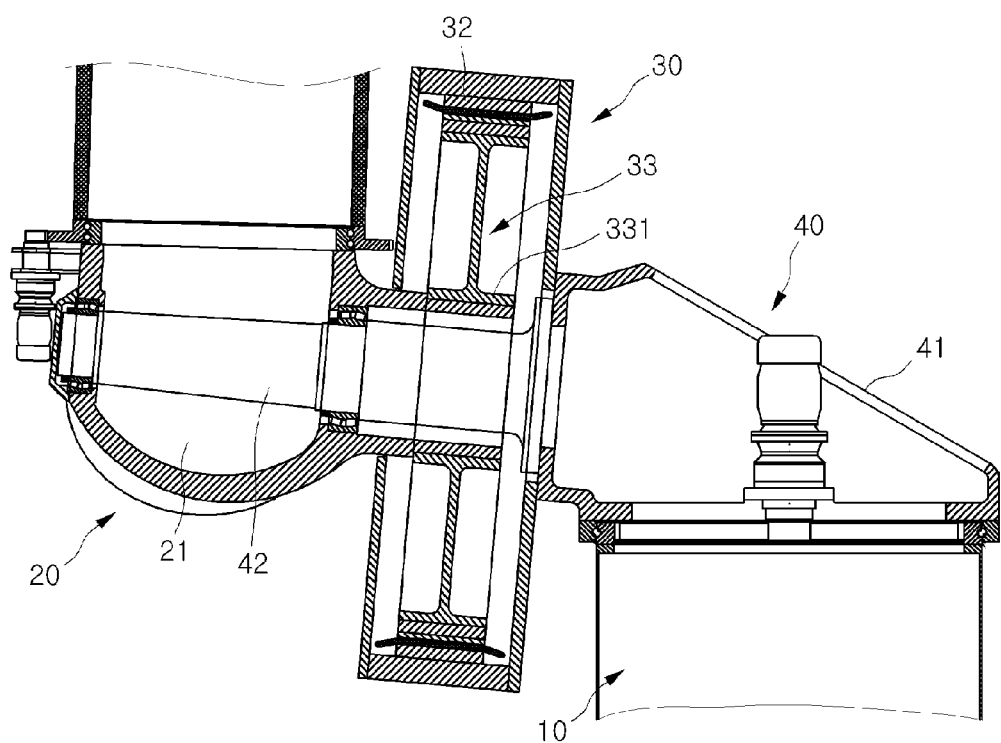
FIG. 2 is a longitudinal section view showing the second embodiment of the present invention.

FIG. 2 is a longitudinal section view showing the second embodiment of the present invention. According to the second embodiment of the present invention, the rotating shaft has a cylindrical shape with an open rear surface and protrudes rearward of the hub 21. The coupling hole 331 is formed at the center of the rotator 33 such that the rotating shaft can be inserted into the coupling hole. A fixing shaft 42 protrudes forward of the support bracket 40 such that the fixing shaft 42 can be rotatably coupled into the hub 21 by passing through the housing and the rotating shaft.

The fixing shaft 42 is spaced apart from the rotating shaft and the coupling hole 331 to prevent friction between the fixing shaft 42 and the rotating shaft when the rotating shaft and the rotator 33 are rotated. At least one bearing 312 is provided in the hub 21 to rotatably support the fixing shaft 42. Thus, the load of the rotor 20 can be transferred to the support bracket 40 through the fixing shaft 42 while bypassing the generator 30.

Accordingly, the load of the rotor 20 and the load of the generator are individually transferred to the support bracket 40, so that the load support function of the support bracket 40 can be maximized. In addition, the diameter of the bearing 312, which transfers the torque to the generator 30, may be reduced so that the weight of the hub 21 can be reduced.

Figure 3:
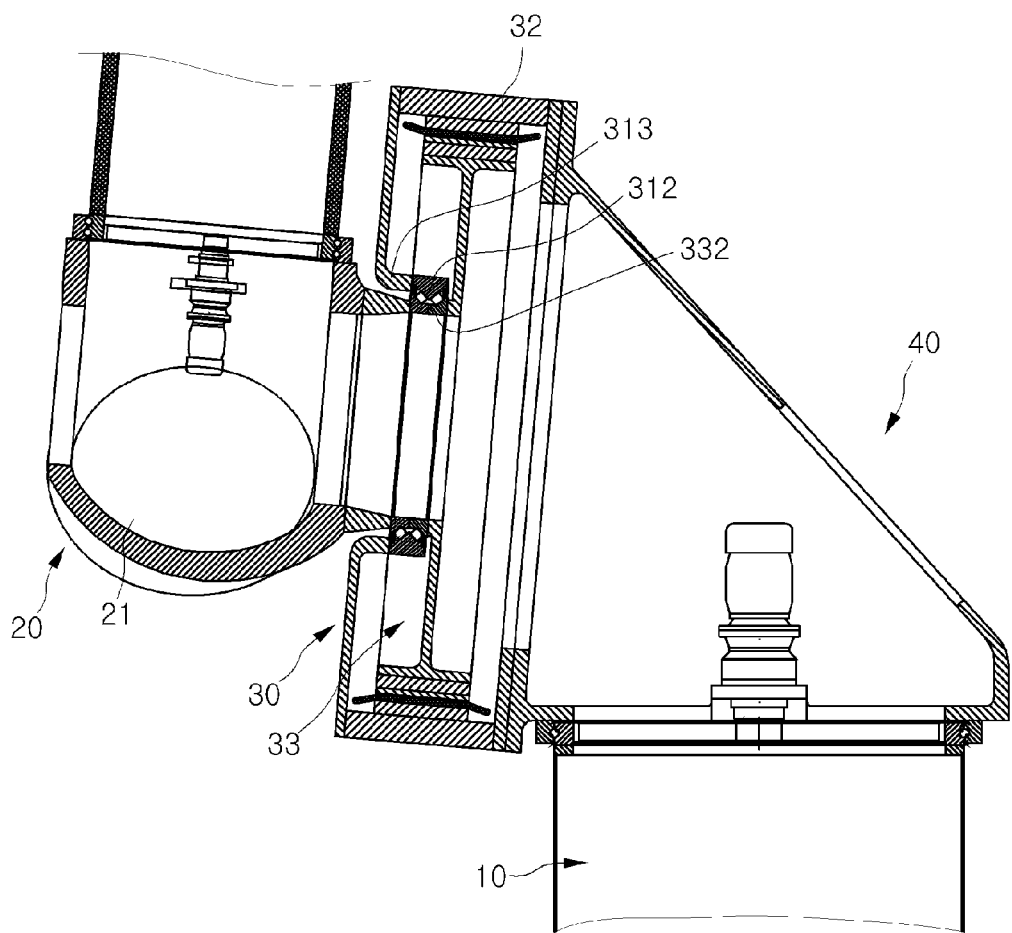
FIG. 3 is a longitudinal section view showing the third embodiment of the present invention.

FIG. 3 is a longitudinal section view showing the third embodiment of the present invention. According to the third embodiment of the present invention, the rotating shaft has a cylindrical shape with an open rear surface and protrudes rearward of the hub 21. A shaft insertion hole 313 is formed at the front surface of the housing and extends inward of the housing such that the rotating shaft can be inserted into the shaft insertion hole 313. Bearings 312 are installed in the shaft insertion hole 313 to support the rotating shaft. A coupling tube 332 is provided at the center of the rotator 33. The coupling tube 332 has a diameter corresponding to the diameter of the rotating shaft and is integrally fixed to an end of the rotating shaft.

Since the bearings 312 are installed between the rotating shaft and the shaft insertion hole 313 of the housing, the rainwater, snow or dust may not penetrate into the generator 30 so that the electric short caused by moisture and impurities can be prevented. In addition, internal components of the generator 30 can be prevented from being corroded.

Figure 4:
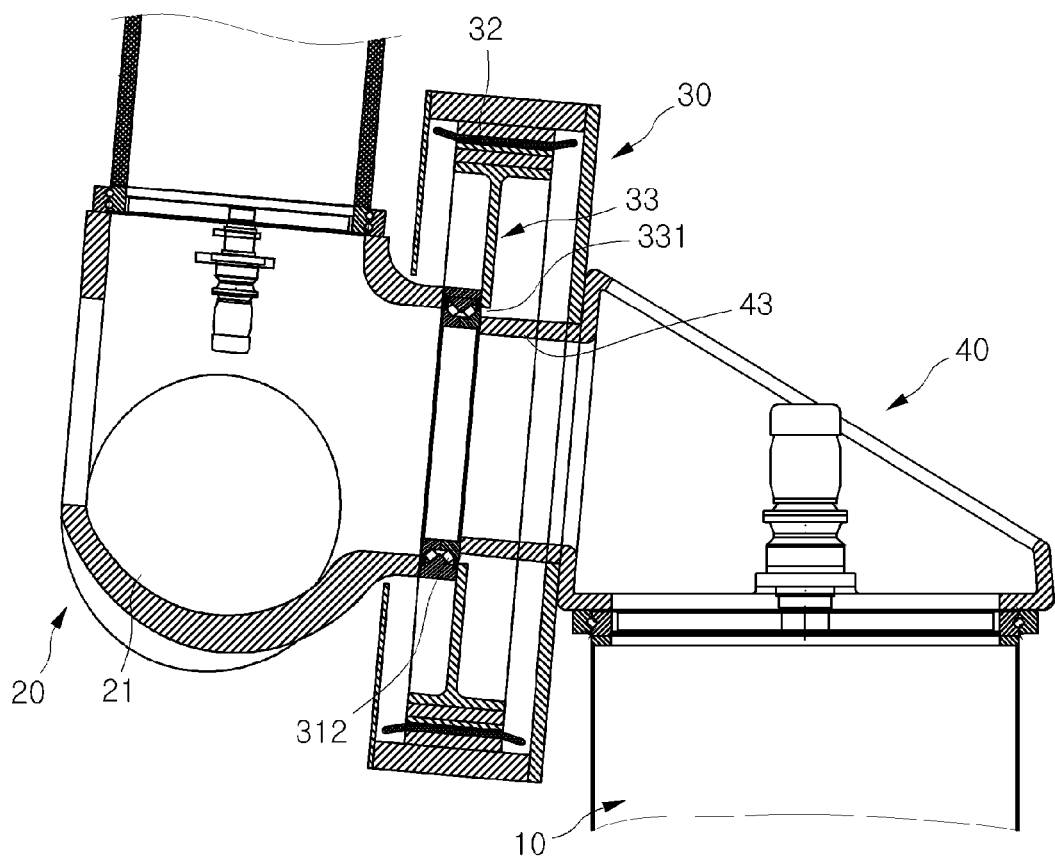
FIG. 4 is a longitudinal section view showing the fourth embodiment of the present invention.
Figure 5:
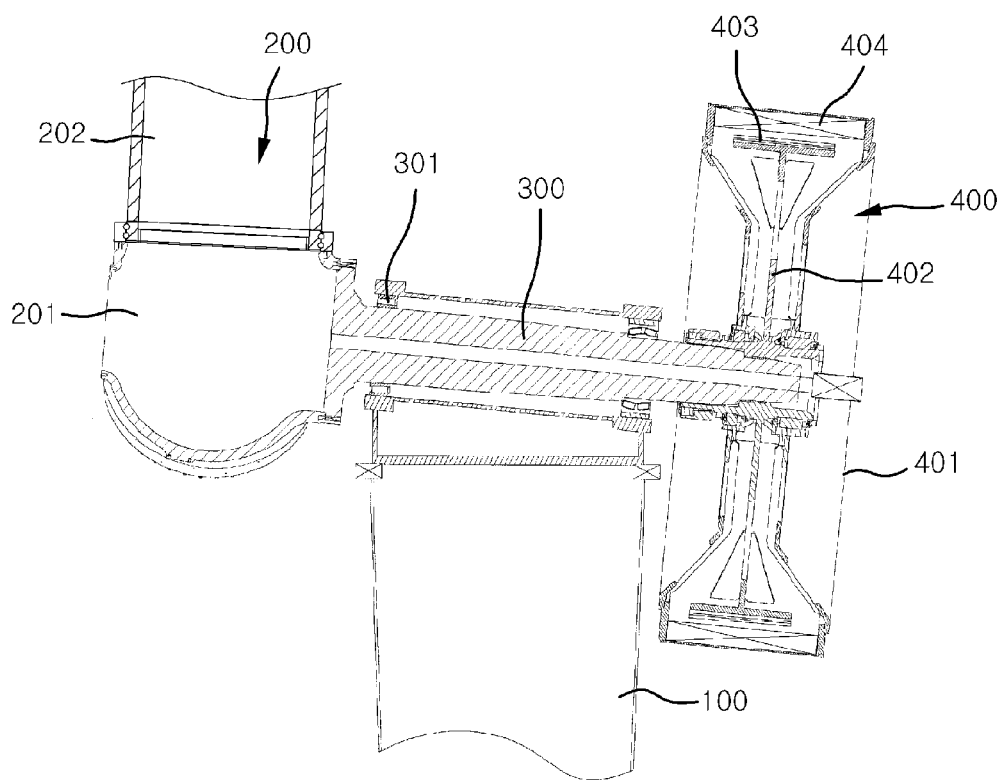
FIG. 5 is a longitudinal section view showing a wind turbine according to the related art.

FIG. 4 is a longitudinal section view showing the fourth embodiment of the present invention.

According to the fourth embodiment of the present invention, the rotating shaft has a cylindrical shape with an open rear surface and protrudes rearward of the hub 21. A coupling hole 331 is formed at the center of the rotator 33. The coupling hole 331 has a diameter corresponding to the diameter of the rotating shaft and the rotating shaft is inserted into the coupling hole 331. A support tube 43 protrudes from the front surface of the support bracket 40. The support tube 43 is communicated with the internal space of the support bracket 40 and fixedly inserted into the housing. The bearings 312 are provided at the outer end of the support tube 43 such that the rotating shaft can be rotatably coupled with the support tube 43.

Thus, the internal space of the hub 21 is communicated with the internal space of the support bracket 40 by way of the generator 30, so the worker may readily approach the hub 21 after the worker has entered the internal space of the support bracket 40 by means of an elevator. Therefore, the repair and maintenance work for the wind turbine may be facilitated.

INDUSTRIAL APPLICABILITY

According to the wind turbine of the present invention, there is no design limitation on the diameter of the generator and the rotor and the generator can be stably fixed to the tower, so the angular speed may be maximized at the position corresponding to the rotator and the stator of the generator and the weight of the turbine system can be reduced. Since the generator can be securely fixed to the upper end portion of the tower, vibration of the generator can be minimized.

In addition, according to the present invention, the perforation hole is formed in the housing and the rotating shaft is inserted into the perforation hole. Thus, the rotating shaft can be securely coupled with the housing even if the bearing supporting the rotating shaft has a small diameter. Therefore, the assembling and disassembling work for the bearing can be simplified and vibration can be reduced during the operation of the rotor.

Further, according to the present invention, the bending strength of the rotating shaft may be increased corresponding to the reduction in the length of the rotating shaft, and the rotating shaft has the diameter gradually increased from the front side to the rear side thereof, so the rotating shaft can be prevented from moving rearward when the rotor is rotated. Thus, the rotating shaft may not be bent or damaged under the strong wind and the generator may stably generate the electric power.

In addition, according to the present invention, the rotator is directly fixed to the fixing shaft protruding from the support bracket, so the diameter of the bearing that transfers the torque to the generator can be reduced. Thus, the weight of the hub can be reduced and the load of the rotor may be directly transferred to the support bracket while bypassing the generator, so that the supporting force can be maximized.

Further, according to the present invention, the shaft insertion hole is formed in the housing and the coupling tube is provided at the rotator. Thus, rainwater or dust may not penetrate through the gap between the housing and the rotating shaft and the rotor may be smoothly rotated. As a result, the internal components of the generator can be prevented from being corroded caused by the rainwater, and the efficiency degradation and failure of the generator caused by the dust can be prevented.

In addition, according to the present invention, the cylindrical support tube is provided at the support bracket such that the cylindrical support tube can be coupled with the rotating shaft. Thus, the worker can readily move along the path among the support bracket, the generator and the hub, so the repair and maintenance work for the wind turbine can be more facilitated.

The invention claimed is:

1. A wind turbine comprising:
a rotor including a hub at a center thereof, a rotating shaft protruding rearward of the hub, and a plurality of rotor blades provided around the hub;
a generator including a housing disposed at an outer upper portion of a tower behind the rotor and provided at an inner surface of a cylindrical body thereof with a stator and a rotator rotatably coupled in the housing to rotate together with the rotor; and
a support bracket fixed to an upper end portion of the tower, wherein the housing is fixed to a front surface of the support bracket to integrally fix the rotor and the generator to the tower,
wherein the rotating shaft has a cylindrical shape with an open rear surface and extends rearward of the hub, a shaft insertion hole is formed at a front surface of the housing and extends inward of the housing such that the rotating shaft is inserted into the shaft insertion hole, a bearing is installed in the shaft insertion hole to support the rotating shaft, and a coupling tube is provided at a center of the rotator, in which the coupling tube has a diameter corresponding to a diameter of the rotating shaft and is integrally fixed to an end of the rotating shaft.

* * * * *